US012072655B2

(12) United States Patent
Sato

(10) Patent No.: US 12,072,655 B2
(45) Date of Patent: Aug. 27, 2024

(54) INFORMATION PROCESSING APPARATUS WITH WHICH DETERIORATION OF COLORIMETRIC ACCURACY IS SUPPRESSED, IMAGE FORMING SYSTEM INCLUDING THE INFORMATION PROCESSING APPARATUS, AND COMPUTER READABLE STORAGE MEDIUM

(71) Applicant: CANON KABUSHIKI KAISHA, Tokyo (JP)

(72) Inventor: Kazumi Sato, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/713,031

(22) Filed: Apr. 4, 2022

(65) Prior Publication Data

US 2022/0326646 A1 Oct. 13, 2022

(30) Foreign Application Priority Data

Apr. 12, 2021 (JP) ................................ 2021-067245

(51) Int. Cl.
*G03G 15/00* (2006.01)

(52) U.S. Cl.
CPC ..... *G03G 15/5025* (2013.01); *G03G 15/5016* (2013.01); *G03G 15/5054* (2013.01); *G03G 2215/00063* (2013.01); *G03G 2215/0158* (2013.01)

(58) Field of Classification Search
CPC .......... G03G 15/5025; G03G 15/5054; G03G 15/5016
See application file for complete search history.

(56) References Cited

U.S. PATENT DOCUMENTS

2009/0103121 A1* 4/2009 Horita ................. H04N 1/6011 358/1.9
2019/0146735 A1 5/2019 Tsukano ............... G06F 3/1254

FOREIGN PATENT DOCUMENTS

JP 2016048904 A * 4/2016 .......... G06K 15/027
JP 2019-092050 6/2019

OTHER PUBLICATIONS

Machine translation of JP2016048904 (Year: 2016).*
U.S. Appl. No. 17/714,605, filed Apr. 6, 2022.

* cited by examiner

*Primary Examiner* — Walter L Lindsay, Jr.
*Assistant Examiner* — Andrew V Do
(74) *Attorney, Agent, or Firm* — Venable LLP

(57) ABSTRACT

An information processing apparatus includes: a setting unit configured to set one or more colorimetric regions in an image to be formed based on image data; and a transmission unit configured to transmit a print job to an image forming apparatus, the print job including the image data and colorimetric region information indicating the one or more colorimetric regions. The setting unit has a first mode under which the setting unit selects, based on a selection criterion, a colorimetric region in the image to be formed based on the image data, and a second mode under which a user designates the colorimetric region.

11 Claims, 9 Drawing Sheets

INFORMATION PROCESSING APPARATUS WITH WHICH DETERIORATION OF COLORIMETRIC ACCURACY IS SUPPRESSED, IMAGE FORMING SYSTEM INCLUDING THE INFORMATION PROCESSING APPARATUS, AND COMPUTER READABLE STORAGE MEDIUM

BACKGROUND OF THE INVENTION

Field of the Invention

The present invention relates to an information processing apparatus with which deterioration of colorimetric accuracy is suppressed, an image forming system including the information processing apparatus, and a computer readable storage medium.

Description of the Related Art

With an image forming apparatus that forms an image using an electrophotographic process, an output image may have density, tint, and the like changing due to a change over time or a change in the ambient condition. In view of this, the image forming apparatus performs image stabilization control. For example, in density stabilization control, the image forming apparatus forms a test image on a photoconductor, an intermediate transfer belt, and the like, and detects the density of the test image using an optical sensor or the like. Then, the image forming apparatus sets an image forming condition to achieve an appropriate density of the output image, based on the result of detecting the density of the test image. With the result of detection on the test image formed on the photoconductor, the intermediate transfer belt, and the like, the quality of an image finally formed on a recording material cannot be determined. In view of this, an image forming condition is further set based on the result of the detection on the test image formed on the recording material.

US-2019-146735 discloses a configuration for a user to visually check an image formed on a recording material, and designate and adjust a color to be corrected.

A sensor for measuring a color value of an image formed on the recording material irradiates the recording material with light and detects a color in a colorimetric region based on the resultant reflected light. In principle, this process may involve a phenomenon, known as "reflection", resulting in a color of the detected colorimetric region being blurred due to reflected light from a portion in the vicinity of the colorimetric region. When the reflection occurs, the colorimetric accuracy deteriorates, and an appropriate image forming condition may become impossible to set.

SUMMARY OF THE INVENTION

According to an aspect of the present disclosure, an information processing apparatus includes: a setting unit configured to set one or more colorimetric regions in an image to be formed based on image data; and a transmission unit configured to transmit a print job to an image forming apparatus, the print job including the image data and colorimetric region information indicating the one or more colorimetric regions, wherein the setting unit has a first mode under which the setting unit selects, based on a selection criterion, a colorimetric region in the image to be formed based on the image data, and a second mode under which a user designates the colorimetric region.

Further features of the present invention will become apparent from the following description of exemplary embodiments with reference to the attached drawings.

DESCRIPTION OF THE EMBODIMENTS

Figure 1:
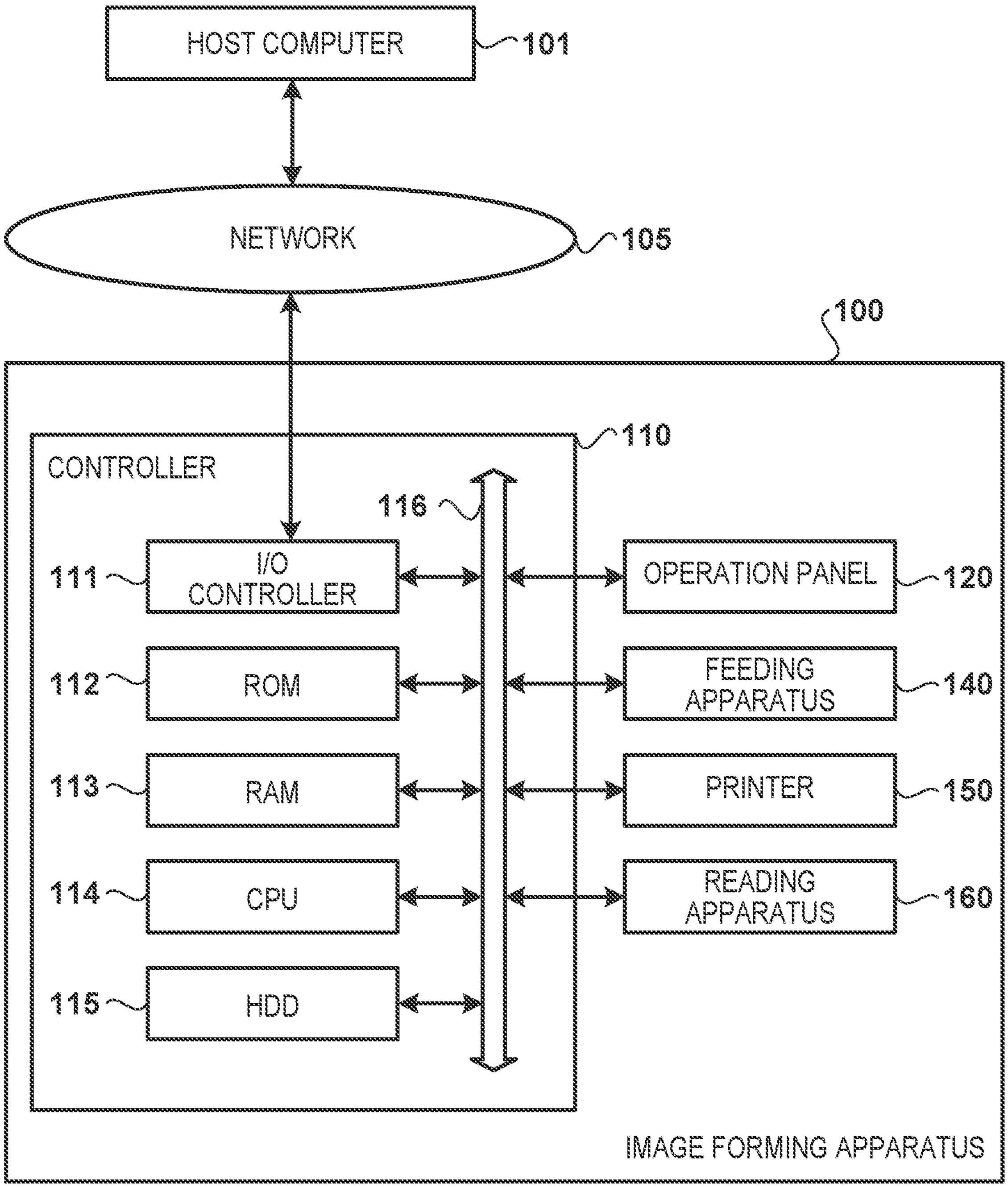
FIG. 1 is a configuration diagram of an image forming system according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

FIG. 1 is a configuration diagram of an image forming system including an image forming apparatus 100. The image forming system includes the image forming apparatus 100 and a host computer 101. The image forming apparatus 100 and the host computer 101 can communicate with each other over a network 105. The network 105 is, for example, a LAN or WAN. In FIG. 1, one image forming apparatus 100 and one host computer 101 are connected to the network 105, but a plurality of the image forming apparatuses 100 and a plurality of the host computers 101 can be connected to the network 105.

The host computer 101, which is an information processing apparatus, transmits a print job to the image forming apparatus 100 over the network 105. The print job includes various types of information required for printing, such as image data of an image to be formed, the type of sheet on which printing (image forming) is to be performed, the number of printed sheets, and whether double-sided printing or one-sided printing is performed.

The image forming apparatus 100 forms an image on the sheet based on the print job received from the host computer 101. The sheet is a target of image forming by the image forming apparatus 100, such as printing paper or an OHP sheet, and can be made of any material. The image forming apparatus 100 includes a controller 110, an operation panel 120, a feeding apparatus 140, a printer 150, and a reading apparatus 160, which can communicate with each other via a system bus 116.

A ROM 112 that is a nonvolatile memory of the controller 110 stores various types of control programs. A RAM 113 is a volatile memory, and functions as a system work memory for reading and storing a control program stored in the ROM 112. A CPU 114 executes the control program read on the RAM 113 to collectively control the entire image forming apparatus 100. An HDD 115 is a large-capacity storage apparatus. The HDD 115 stores various types of data such as control programs and image data used for image forming processing (print processing). An I/O controller 111 is an interface for communicating with the host computer 101 and the like over the network 105. These functional blocks in the controller 110 can communicate with each other via the system bus 116.

Figure 2:
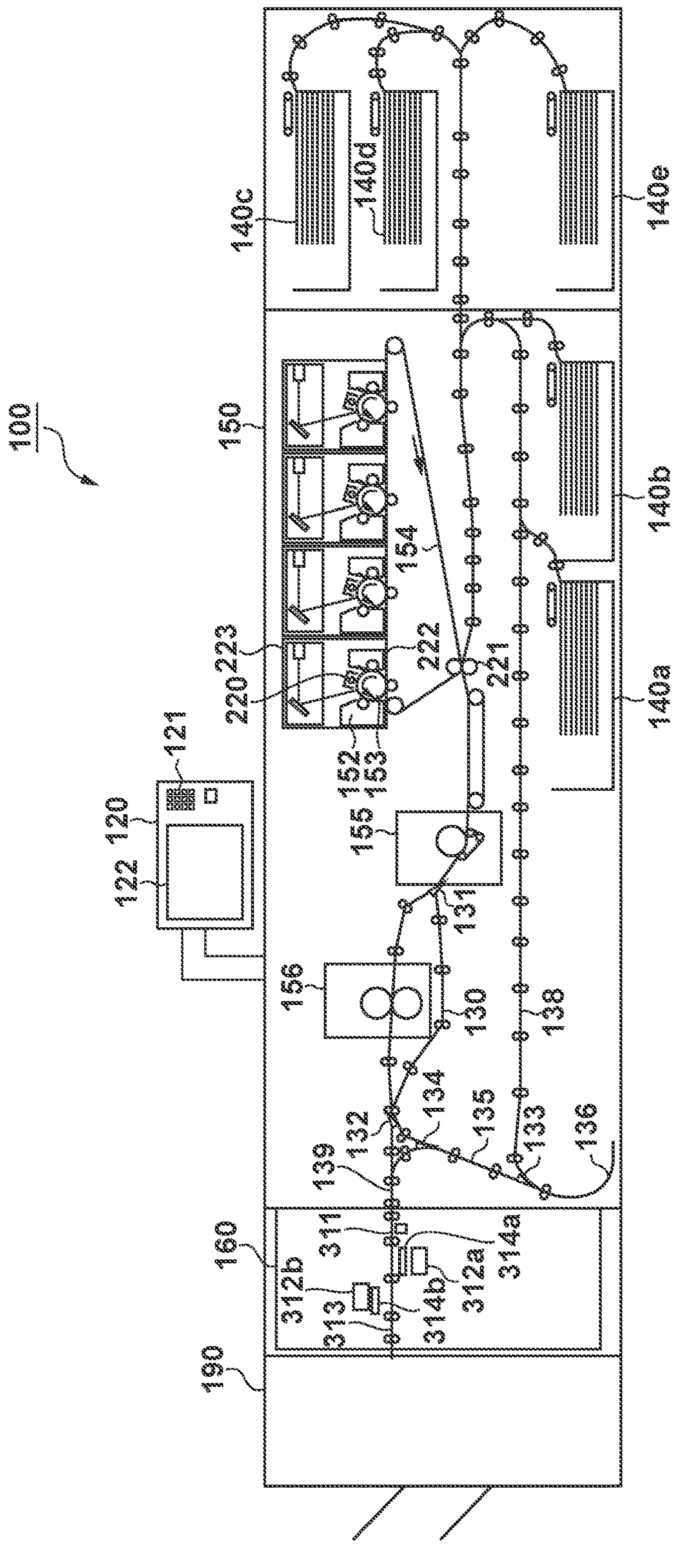
FIG. 2 is a configuration diagram of an image forming apparatus according to an embodiment.

The operation panel 120 provides a user interface. As illustrated in FIG. 2, the operation panel 120 includes operation buttons 121 and a display unit 122. The operation buttons 121 are an input interface for a user to operate the image forming apparatus 100. The display unit 122 is an output interface that displays a status of the image forming apparatus to the user.

Referring back to FIG. 1, the feeding apparatus 140 includes a plurality of feeding units containing sheets, and feeds the sheets in the feeding units to the printer 150. The printer 150 forms an image on the sheet fed from the feeding apparatus 140, based on image data from the host computer 101. A configuration of the printer 150 will be described below in detail with reference to FIG. 2. The reading apparatus 160 reads a surface of a sheet, and outputs the result of the reading to the controller 110.

FIG. 2 is a configuration diagram of the image forming apparatus 100. The image forming apparatus 100 includes the feeding apparatus 140, the printer 150, the reading apparatus 160, and a finisher 190.

The printer 150 includes four image forming units 222 that form yellow, magenta, cyan and black images. The image forming units 222 basically have a common configuration. A photoconductor 153 of the image forming unit is rotationally driven in a counterclockwise direction in the drawing during an image forming process. A charger 220 charges the surface of the photoconductor 153. An exposing apparatus 223 forms an electrostatic latent image on the photoconductor 153 by exposing the photoconductor 153 based on image data. A developing unit 152 develops the electrostatic latent image on the photoconductor 153 using a developing agent (toner). As a result, the electrostatic latent image on the photoconductor 153 is developed, whereby an image is formed on the photoconductor 153.

An intermediate transfer belt 154 is rotationally driven in a clockwise direction in the drawing during an image forming process. The image formed by each of the image forming units 222 is transferred to the intermediate transfer belt 154. Here, it is possible to form a full-color image on the intermediate transfer belt 154 by transferring the images formed by the image forming units 222 to the intermediate transfer belt 154 in an overlapping manner. The images transferred onto the intermediate transfer belt 154 are conveyed to an opposing position of transfer rollers 221.

The feeding apparatus 140 includes feeding units 140*a*, 140*b*, 140*c*, 140*d*, and 140*e* containing sheets. The feeding apparatus 140 feeds a sheet in any feeding unit to the printer 150. The printer 150 conveys the fed sheet toward the opposing position of the transfer rollers 221. The transfer rollers 221 transfer the images on the intermediate transfer belt 154 to the sheet.

The printer 150 includes a first fixing unit 155 and a second fixing unit 156 that heat and pressurize the images transferred to the sheet to fix the images to the sheet. The first fixing unit 155 includes fixing rollers including a heater therein, and a pressure belt for pressing the sheet to the fixing rollers. The rollers are driven by a motor (not illustrated) to convey the sheet. The second fixing unit 156 is disposed downstream from the first fixing unit 155 in the conveyance direction of the sheet. The second fixing unit 156 is provided to increase the gloss of the images on the sheet passing through the first fixing unit 155 and to ensure fixability. The second fixing unit 156 includes a fixing roller including a heater therein, and a pressure roller including a heater therein. The second fixing unit 156 is not required depending on the type of sheet. In this case, the sheet is conveyed to a conveyance path 130 and does not pass through the second fixing unit 156. A flapper 131 switches whether it guides the sheet to the conveyance path 130 or guides the sheet to the second fixing unit 156.

A flapper 132 switches whether it guides the sheet to a conveyance path 135 or guides the sheet to a discharge path 139. The flapper 132 guides, for example, a sheet having an image formed on a first surface in a double-sided printing mode to the conveyance path 135. The flapper 132 also guides, for example, a sheet having an image formed on the first surface in a face-up discharge mode to the discharge path 139. Furthermore, the flapper 132 guides, for example, a sheet having an image formed on the first surface in a face-down discharge mode to the conveyance path 135.

The sheet conveyed to the conveyance path 135 is conveyed to a reversing unit 136. After being conveyed to the reversing unit 136, the sheet conveyance direction is reversed. A flapper 133 switches whether it guides the sheet in the reversing unit 136 to a conveyance path 138 or guides the sheet to the conveyance path 135. The flapper 133 guides, for example, the sheet to the conveyance path 138 in the double-sided printing mode. Furthermore, the flapper 133 guides, for example, a sheet having been switched back in the face-down discharge mode to the conveyance path 135. The sheet conveyed by the flapper 133 to the conveyance path 135 is guided by a flapper 134 to the discharge path 139. The sheet conveyed to the conveyance path 138 by the flapper 133 is again conveyed to the opposing position of the transfer rollers 221, whereby an image is formed on both sides of the sheet.

The sheet guided to the discharge path 139 is conveyed along a conveyance path 313 of the reading apparatus 160. An original detection sensor 311 of the reading apparatus 160 detects a sheet conveyed along the conveyance path 313. The original detection sensor 311 is, for example, an optical sensor including a light-emitting element and a light-receiving element. A line sensor unit 312*a* reads one side of the sheet through an original reading glass 314*a*. A line sensor unit 312*b* reads the other side of the sheet through an original reading glass 314*b*. Note that the controller 110 controls the reading timing of the line sensor units 312*a* and 312*b* based on a detection timing of the sheet leading end by the original detection sensor 311.

The sheet that has passed through the reading apparatus 160 is discharged to the outside of the image forming apparatus 100 through the finisher 190. The finisher 190 is a post-processing apparatus that performs post-processing on a print product from the printer 150. The finisher 190 can perform staple processing and sort processing on a plurality of sheets on which an image has been formed, based on the print job.

Figure 3:
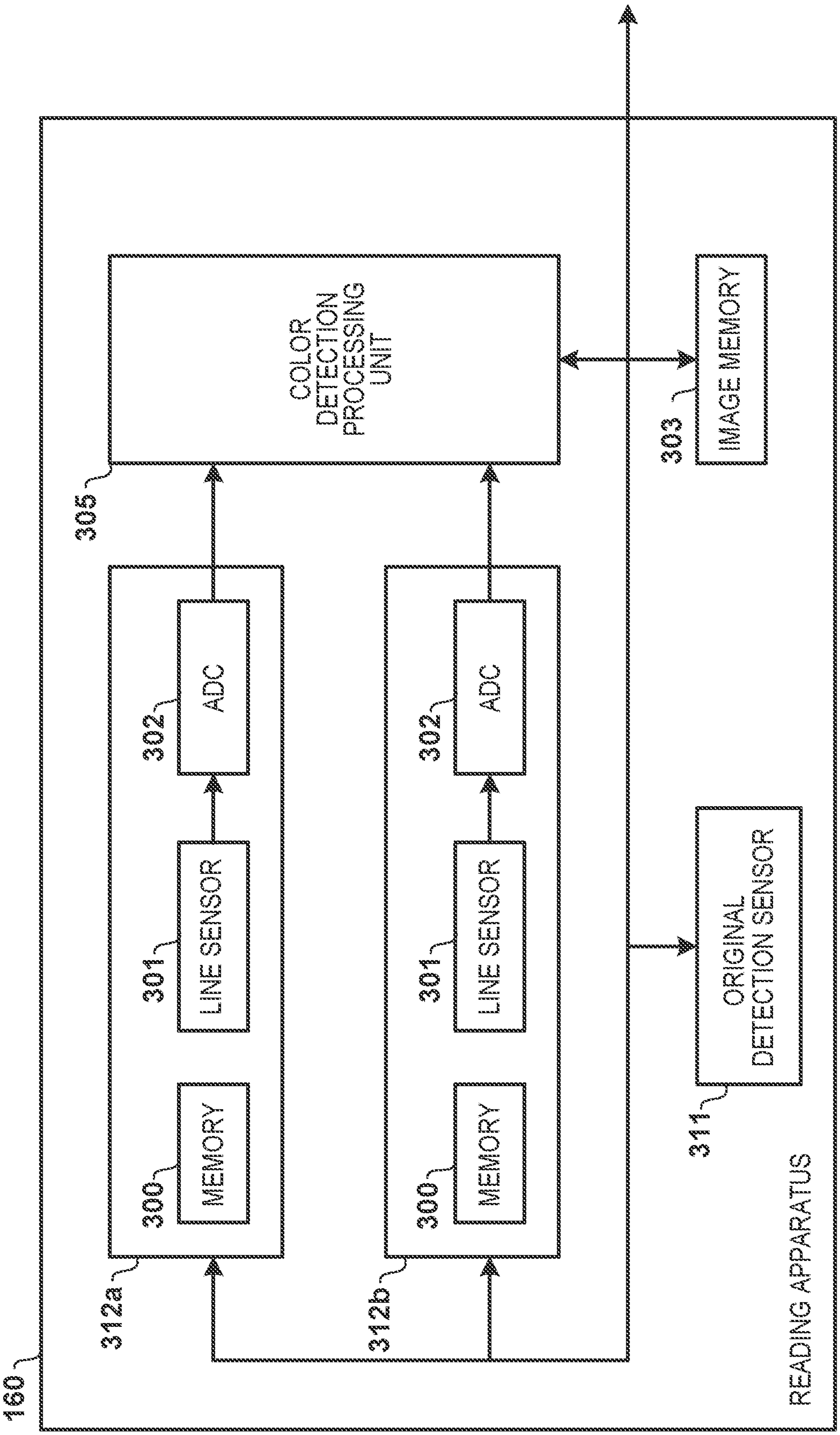
FIG. 3 is a configuration diagram of a reading apparatus according to an embodiment.
Figure 4:
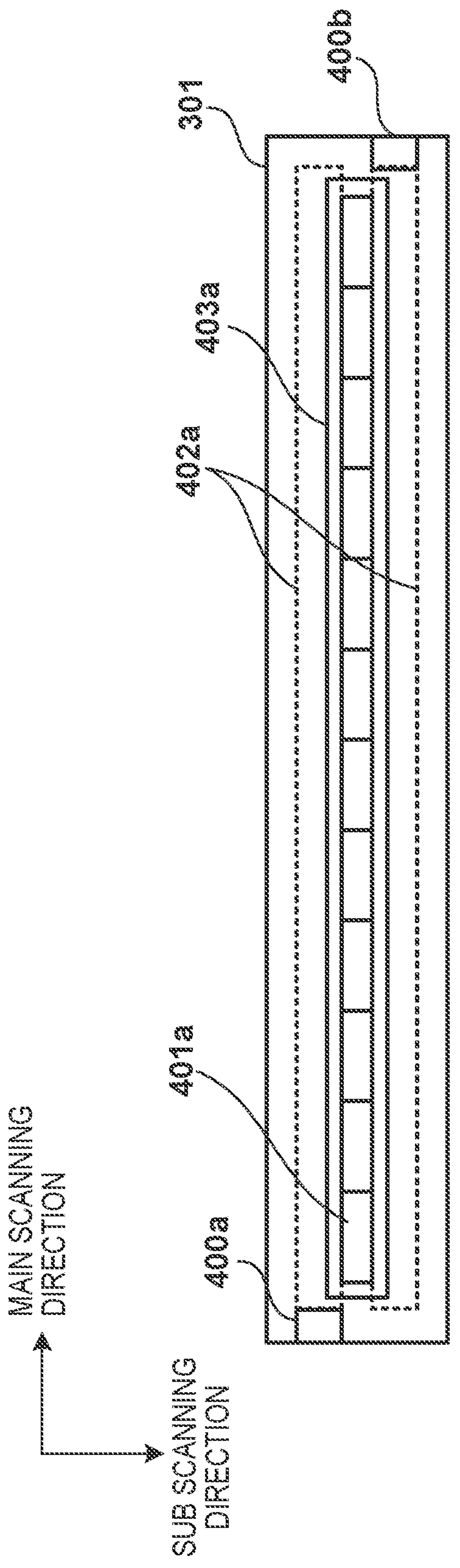
FIG. 4 is a configuration diagram of a line sensor unit according to an embodiment.

FIG. 3 is a functional block diagram of the reading apparatus 160. The line sensor units 312*a* and 312*b* have the same configuration, and each include a memory 300, a line sensor 301, and an analog-to-digital converter (ADC) 302. The line sensor 301 is, for example, a contact image sensor (CIS). FIG. 4 is a configuration diagram of the line sensor 301. LEDs 400*a* and 400*b* are light sources and emit white light. The LEDs 400*a* and 400*b* are respectively disposed at different end portions of light guides 402*a*, in the longitudinal direction. Note that the line sensor 301 is disposed to have the longitudinal direction being orthogonal to the conveyance direction of the sheet. Hereinafter, the longitudinal direction is also referred to as a main scanning direction, and the conveyance direction of the sheet is also referred to as a sub scanning direction. The light emitted by the LEDs 400*a* and 400*b* is diffused, in the main scanning direction, in the light guides 402*a*, and is emitted onto the sheet from the entirety of the light guides 402*a* in the main scanning direction. The reflected light from the sheet is incident on a plurality of light-receiving elements 401*a*, arranged along the main scanning direction, through a lens array 403*a*. Note that a reflection position, of the reflected light to be incident on each of the light-receiving elements 401*a*, in the sheet is also referred to as a pixel. The plurality of light-receiving elements 401*a* have a three-line configuration applied with red (R), green (G), and blue (B) color filters. The line sensor 301 according to the present embodiment is of a "double-sided illumination configuration", with which light is emitted from both sides of the lens array 403*a* in the sub scanning direction.

Referring back to FIG. 3, the memory 300 stores correction information for correcting variation in light quantity and the like among the plurality of light-receiving elements 401*a* of the corresponding line sensor 301. The line sensor 301 corrects the received light quantity of each of the light-receiving elements 401*a* using the correction information, and outputs an analog signal, indicating the received light quantity of each of the light-receiving elements 401*a* after the correction, sequentially to the ADC 302 as the received light quantity of the pixel. The ADC 302 converts the analog signal output from the corresponding line sensor 301, into a digital signal, and outputs the signal to a color detection processing unit 305 as read data. The read data indicates a luminance value of red (R), green (G), and blue (B) of each pixel. While the sheet is being conveyed, the line sensor 301 repeatedly reads an image corresponding to a single line in the main scanning direction, to read an image over the entirety of the sheet.

The color detection processing unit 305 outputs detected color information, which is color information on a colorimetric region in the RGB read data on the entire sheet, to the CPU 114. Note that the colorimetric region is notified from the CPU 114 as described below. The color detection processing unit 305 is configured by using an FPGA, an ASIC, a combination of these, or the like. An image memory 303 is used to temporarily store the read data in processing in the color detection processing unit 305. Thus, the reading apparatus 160 also serves as a colorimetric apparatus that measures a color value of the colorimetric region of the sheet.

In the present embodiment, the user operates the host computer 101 to set a color that is a target of image stabilization control (hereinafter, referred to as target color), and set a colorimetric region of the target color on the sheet. The host computer 101 transmits a print job, including colorimetric region information indicating the colorimetric region, to the controller 110 of the image forming apparatus 100. The CPU 114 notifies the reading apparatus 160 of the colorimetric region, and the reading apparatus 160 outputs the detected color information on the colorimetric region to the CPU 114. The CPU 114 performs the image stabilization control of the target color by comparing the detected color information, which is the result of measuring the color value of the colorimetric region, and a data value (color information) on the colorimetric region indicated by the image data included in the print job. More specifically, the CPU 114 sets/adjusts an image forming condition, to make the target color of the image formed by the image forming apparatus 100, close to the color indicated by the image data.

Figure 5:
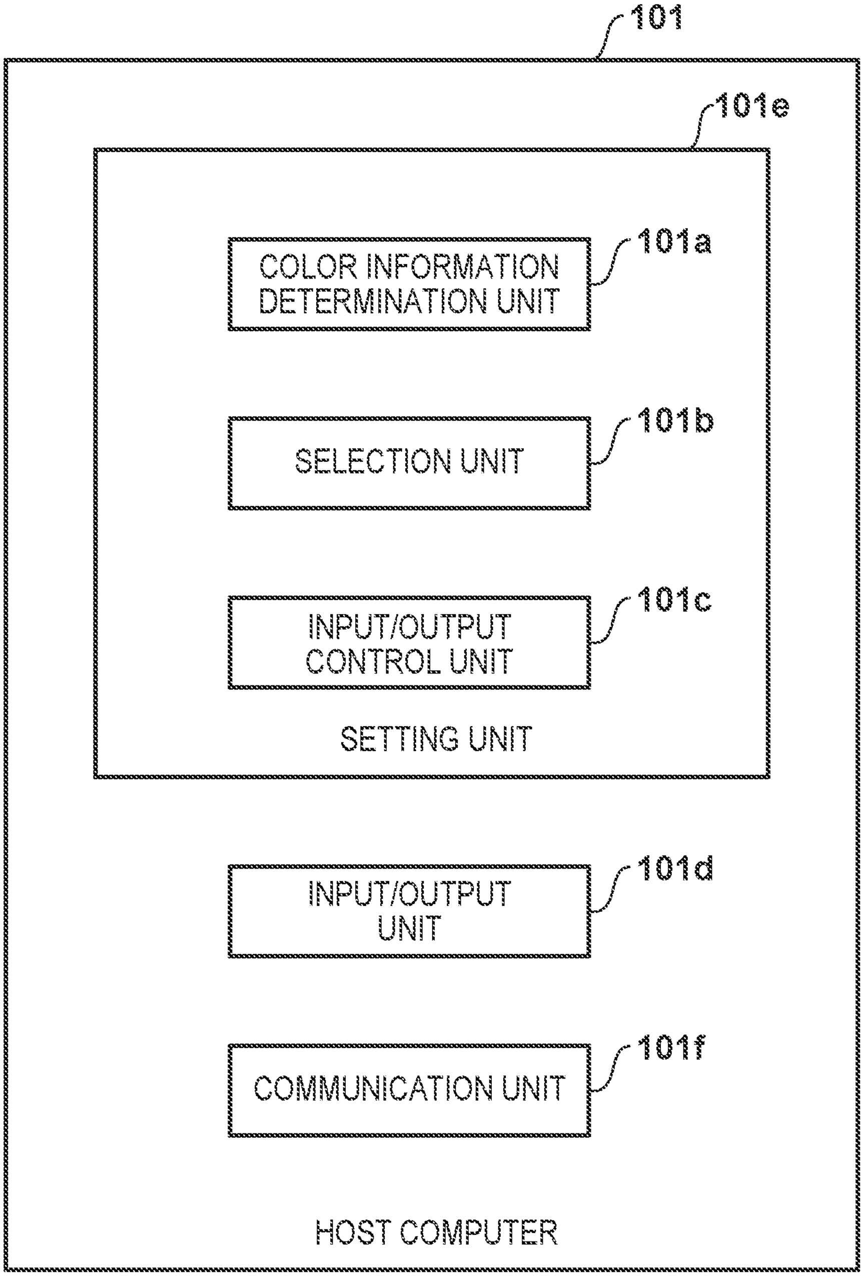
FIG. 5 is a block diagram of a host computer according to an embodiment.

The host computer 101 will be described below. FIG. 5 is a functional block diagram of the host computer 101. A communication unit 101*f* performs communication processing over the network 105. An input/output unit 101*d* includes, for example, an input device such as a mouse and a keyboard, and an output device such as a display. Note that when the host computer 101 is not a personal computer and is, for example, a tablet, the input/output unit 101*d* may be a touch panel display. A setting unit 101*e* includes a color information determination unit 101*a*, a selection unit 101*b*, and an input/output control unit 101*c*. The setting unit 101*e* is a functional block that may be realized with one or more processors (not illustrated) of the host computer 101 executing an appropriate program. Note that the program is stored in a memory device (not illustrated) of the host computer 101.

Figure 6:
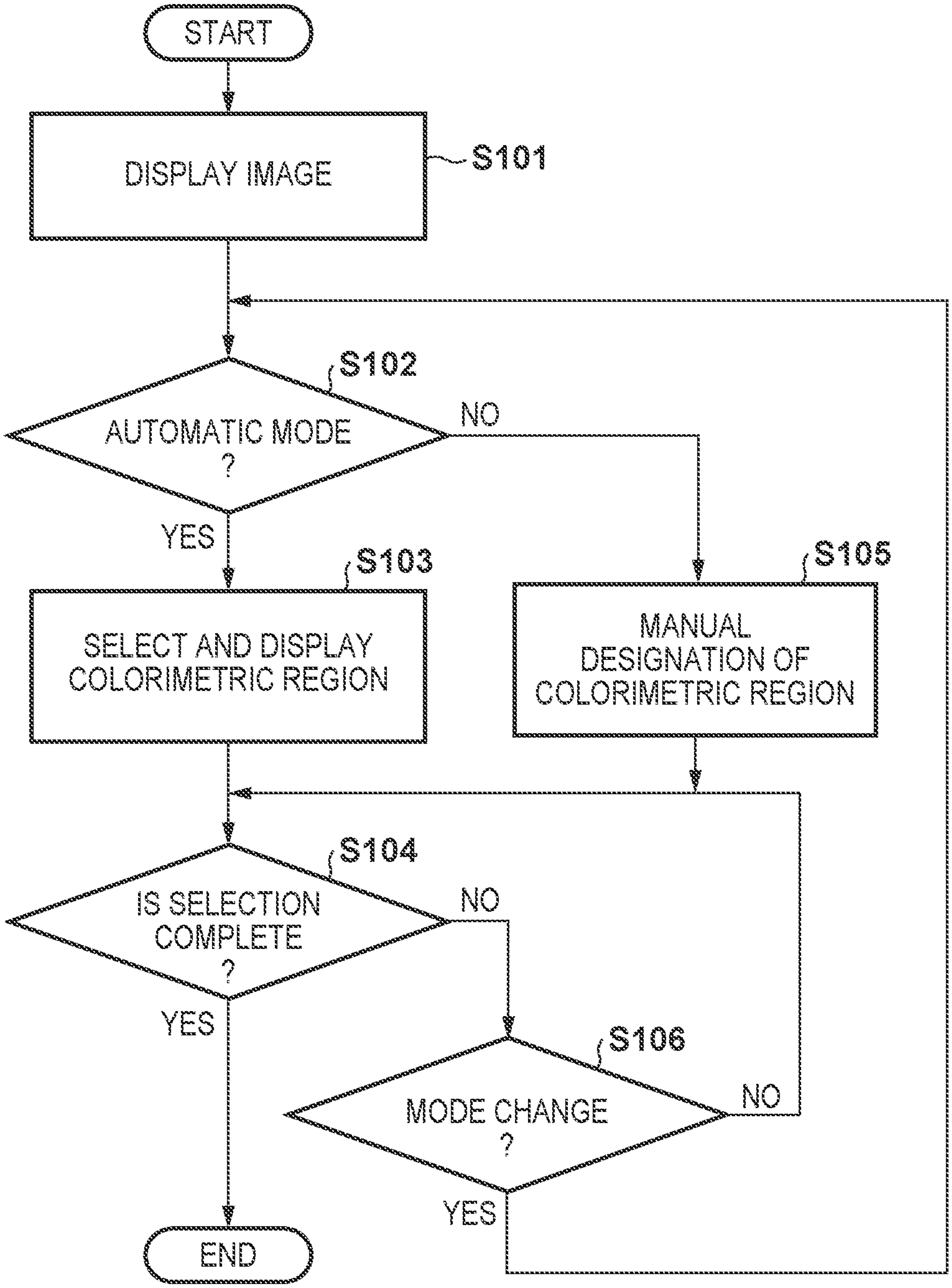
FIG. 6 is a flowchart of colorimetric region setting processing according to an embodiment.
Figure 7:
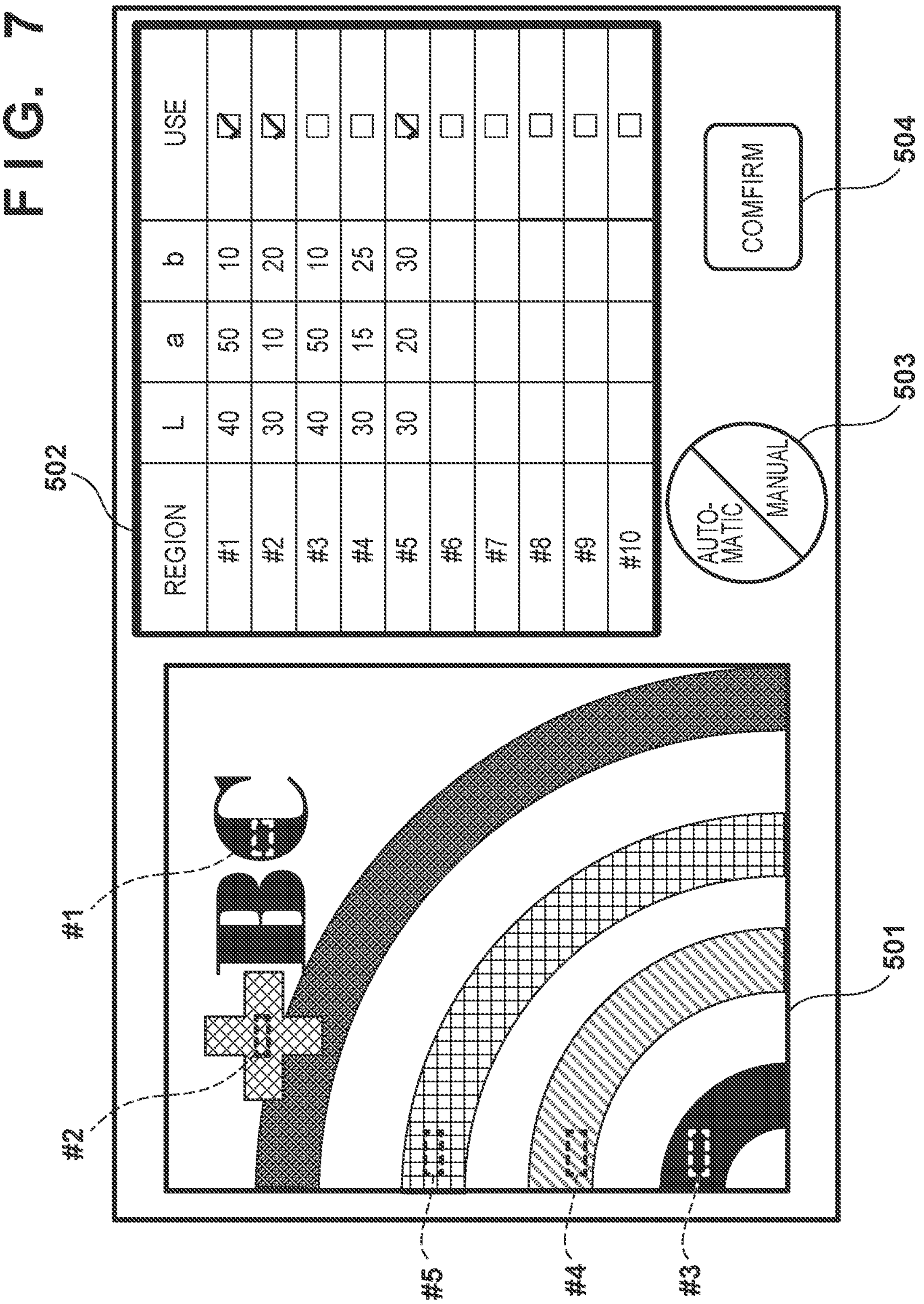
FIG. 7 is a diagram illustrating an example of a screen displayed to a user in colorimetric region setting processing.

FIG. 6 is a flowchart of colorimetric region setting processing. The processing in FIG. 6 is executed when the user transmits a print job to the image forming apparatus 100, for performing the stabilization control. In S101, the input/output control unit 101*c* displays an image formed based on the image data included in the print job, on a display of the input/output unit 101*d*. FIG. 7 is an example of a screen displayed on the display of the input/output unit 101*d*. As illustrated in FIG. 7, an image 501 formed based on the image data is displayed on the display.

In S102, the input/output control unit 101*c* determines which of an automatic mode and a manual mode is selected as a setting mode. The user can select/set the automatic mode or the manual mode, by operating a mode button 503 displayed on the display.

When the manual mode is selected, the user operates the input/output unit 101*d* in S105 to input a user input designating a region. The user designates this region by, for example, designating a region including the target color in the image 501 displayed on the display, using a mouse. When the user designates the region, the color information determination unit 101*a* determines whether the region designated by the user satisfies a predetermined criterion. A configuration may be employed in which the predetermined criterion is satisfied when the maximum value of a color difference in the designated region, indicated by the image data, is equal to or smaller than a threshold. Note that the threshold can be 0. When the threshold is 0, the predetermined criterion is satisfied when pixels of the region designated by the user have the same color value. When the maximum value of the color difference in the designated region exceeds the threshold, the input/output control unit 101*c* issues a warning indicating that the color difference is large in the designated region, to induce the user to designate the region again.

On the other hand, when the maximum value of the color difference in the designated region is equal to or smaller than the threshold, the input/output control unit 101*c* displays a list of candidates of the colorimetric region, including the region designated by the user, in an area 502 on the display. A colorimetric region #1 and a colorimetric region #2 displayed in the area 502 in FIG. 7 are colorimetric regions designated by the user. As illustrated in FIG. 7, the input/output control unit 101*c* displays, on the display, the colorimetric region #1 and the colorimetric region #2 designated by the user, in an overlapping manner on the image 501. Based on the image data, the color information determination unit 101*a* determines the color values of the colorimetric region #1 and the colorimetric region #2 designated by the user, and displays the values in the area 502 as illustrated in FIG. 7. Note that while color values in the Lab space are displayed in FIG. 7, color values in other color spaces such as the RGB space can be displayed. When the pixels in the colorimetric region have the same color value, this color value is displayed as the color value of the colorimetric region. On the other hand, when the pixels in the colorimetric region have different color values, a representative color value is displayed as the color value of the colorimetric region. The representative color value is, for example, the color value corresponding to the largest number of pixels in the colorimetric region. Alternatively, the representative color value is, for example, an average value of the color values of the respective pixels in the colorimetric region. Although not illustrated in FIG. 7, a configuration may be employed in which a color corresponding to the color value displayed in the area 502 is displayed in the area 502.

When the automatic mode is selected, the selection unit 101*b* selects the colorimetric region based on a selection criterion in S103. The input/output control unit 101*c* displays a list of candidates of the colorimetric region, including the colorimetric region selected by the selection unit 101*b*, in the area 502 of the display. A colorimetric region #3 to a colorimetric region #5 displayed in the area 502 in FIG. 7 are colorimetric regions selected by the selection unit 101*b*. As illustrated in FIG. 7, the input/output control unit 101*c* displays, on the display, the colorimetric region #3 to the colorimetric region #5, selected by the selection unit 101*b*, in an overlapping manner on the image 501. Furthermore, the color information determination unit 101*a* displays the color values of the colorimetric region #3 to the colorimetric region #5 selected by the selection unit 101*b* in the area 502, as illustrated in FIG. 7. Note that the color value displayed is the same as that under the manual mode. Note that, although not illustrated in FIG. 7, a configuration may be employed in which the colorimetric regions are displayed in the area 502 or on the image 501, in such a manner that the colorimetric region designated by the user and the colorimetric region selected by the selection unit 101*b* can be distinguished from each other.

The selection criterion is a criterion for the selection unit 101*b* to select the colorimetric region in the image 501. This selection criterion is determined and stored in a memory device (not illustrated) of the host computer 101 in advance. The selection criterion includes a condition related to the color value. The condition related to the color value is a condition with which a region in which the variation of color value is equal to or smaller than a predetermined value is selected as the selected region. For example, a maximum tolerable color difference ΔE is determined and stored in advance in the memory device (not illustrated) of the host computer 101. Then, the selection unit 101*b* selects, as the selected region, a region only including pixels with no maximum value of color difference between any two pixels exceeding the maximum tolerable color difference ΔE. Note that the maximum tolerable color difference ΔE can be 0. In this case, the pixels in the colorimetric region have the same color value. The maximum tolerable color difference ΔE may be the same as or different from the threshold in the manual mode.

The selection criterion further includes a condition related to the number of sequential pixels. The condition related to the number of sequential pixels is a condition for selecting, as the colorimetric region, a region that is less likely to be affected by the reflection. For example, the condition related to the number of sequential pixels may include a first condition with which the colorimetric region is selected from regions, of regions satisfying the condition related to the color value, in which the number of sequential pixels in the main scanning direction is larger than a first predetermined number. The first predetermined number can be, in distance, 8 mm, for example. The condition related to the number of sequential pixels may further include a second condition with which the colorimetric region is selected from regions in which the number of sequential pixel arrays, satisfying the first condition, in the sub scanning direction is larger than a second predetermined number. Note that the positions/ranges, in the main scanning direction, of two pixel arrays satisfying the first condition adjacent to each other in the sub scanning direction do not need to be the same. It suffices if the ranges of the two pixel arrays in the main scanning direction include sections with a predetermined number of pixels overlapping. The condition related to the number of sequential pixels may further include a third condition with which the colorimetric region is selected from regions obtained by excluding a third predetermined number of pixels from an edge in the regions of pixels satisfying the second condition. Note that the third predetermined number is smaller than the first predetermined number and the second predetermined number.

The colorimetric region may have any size and shape, as long as the selection criterion is satisfied. For example, a configuration may be employed in which the largest one of the regions, under the condition of satisfying the selection criterion, is selected as the colorimetric region. Note that when there are a plurality of regions satisfying the selection criterion, the selection unit 101*b* may be configured to select some of the regions satisfying the selection criterion as the colorimetric regions, instead of selecting all of such regions. For example, the selection unit 101*b* can select a predetermined number of regions with large area, from the plurality of regions satisfying the selection criterion, as the colorimetric regions.

In the area 502, check boxes corresponding to the respective colorimetric region candidates are displayed. The user can operate the check boxes using a mouse, for example, to input an instruction indicating whether the corresponding colorimetric regions are to be actually used for the image stabilization control. Note that, for example, the initial value of a check box corresponding to the colorimetric region designated by the user under the manual mode (S105) may be "use". On the other hand, the initial value of a check box corresponding to the colorimetric region selected under the automatic mode (S102) may be "not use".

In S104, the input/output control unit 101*c* waits until completion of selection of the colorimetric region to be actually used for the image stabilization control is input by the user. The user inputs the completion of the selection by clicking, with a mouse, a confirm button 504 in FIG. 7. When the completion of the selection is not input, the input/output control unit 101*c* determines whether the setting mode (the automatic mode or the manual mode) has been changed in S106. As described above, the user can switch between the automatic mode and manual mode using the mode button 503. Thus, the setting mode is configured to be switchable until the user clicks the confirm button 504 using a mouse. When the setting mode has not been changed, the input/output control unit 101*c* repeats the processing from S104. On the other hand, when the setting mode has been changed, the input/output control unit 101*c* repeats the processing from S102.

In S104, when the user clicks the confirm button 504 in FIG. 7 using the mouse, the host computer 101 ends the processing in FIG. 6. Thereafter, when the user inputs the execution of printing to the input/output control unit 101*c* using the input/output unit 101, the input/output control unit 101*c* transmits, via the communication unit 101*f*, a print job including the colorimetric region information indicating the colorimetric region selected to be used, to the image forming apparatus 100.

FIG. 7 illustrates a state where the user first designates the colorimetric regions #1 and #2 under the manual mode, and then switches to the automatic mode, and thus the selection unit 101*b* selects the colorimetric region #3 to the region #5. The user has selected to use the colorimetric region #5 selected under the automatic mode for the image stabilization control, in addition to the colorimetric regions #1 and #2 designated under the manual mode.

In the present embodiment described above, the host computer 101 can select the automatic mode and the manual mode as the setting mode for setting the colorimetric region. When the automatic mode is selected, the host computer 101 presents, to the user, a region that is less likely to be affected by the reflection as the colorimetric region. Thus, when the desired target color is included in the colorimetric region presented by the host computer 101, the user can select the presented colorimetric region to set an appropriate image forming condition with deterioration of the colorimetric accuracy suppressed. Note that, for example, when the target color desired by the user is not included in the colorimetric region presented, the user can designate a colorimetric region including the target color under the manual mode, whereby the usability of the user can be improved.

Second Embodiment

Figure 8:
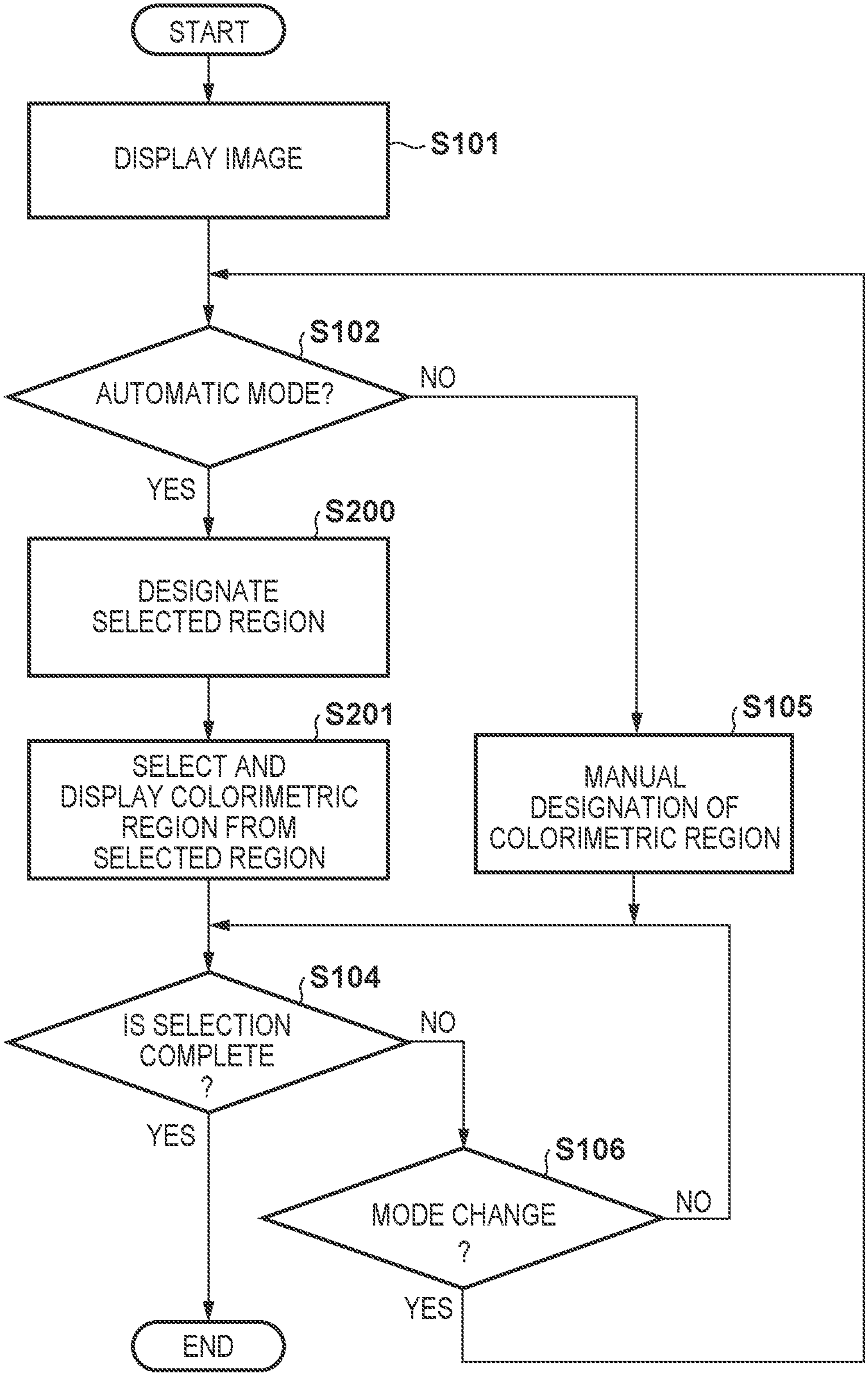
FIG. 8 is a flowchart of colorimetric region setting processing according to an embodiment.

The following describes a second embodiment mainly about differences from the first embodiment. FIG. 8 is a flowchart of colorimetric region setting processing according to the present embodiment. Note that, the processing steps similar to those in the flowchart of the setting processing in the first embodiment in FIG. 6 are denoted with the same step numbers and descriptions thereof will be omitted.

Figure 9:
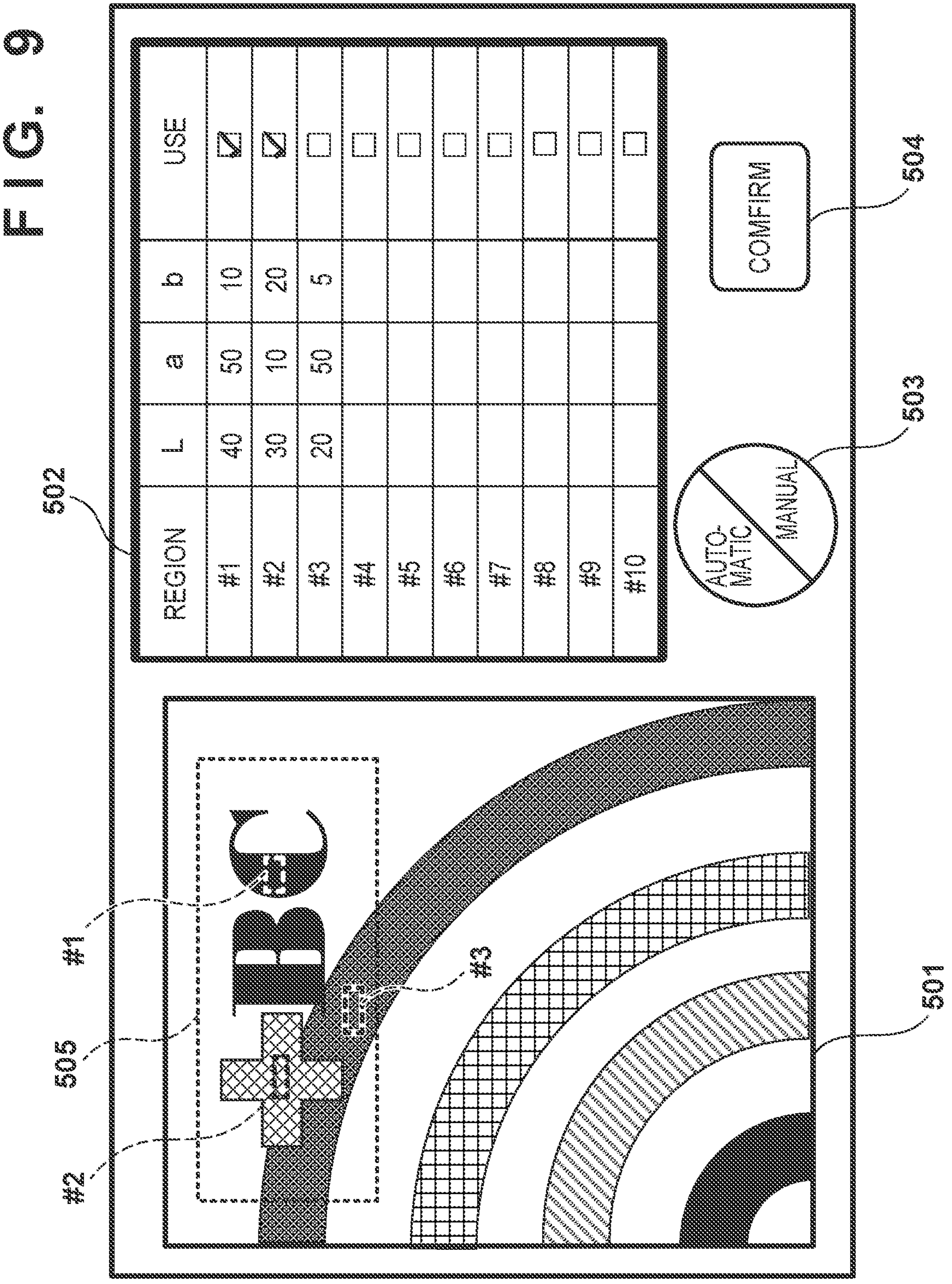
FIG. 9 is a diagram illustrating an example of a screen displayed to a user in colorimetric region setting processing.

When the automatic mode is selected in S102, the user designates the selected region in S200. The selected region can be designated with the method that is the same as that for designating the colorimetric region under the manual mode. FIG. 9 illustrates a state in which the user has selected a region 505 as the selected region in S200. In this case, the selection unit 101*b* selects candidates of the colorimetric region in the selected region 505 in S201. FIG. 9 illustrates a state in which the selection unit 101*b* has selected a region #1 to a region #3, in the selected region 505, as candidates of the colorimetric region.

As described above, the selection unit 101*b* selects the colorimetric region in the selected region 505 designated by the user. With the user designating a region including the target color as the selected region, the number of colorimetric regions selected by the selection unit 101*b* can be narrowed down. As described in the first embodiment, when the upper limit value of the number of colorimetric regions selected by the selection unit 101*b* is determined, with the selected region 505 being selected, the colorimetric region selected by the selection unit 101*b* is likely to include the target color. Thus, with a region less likely to be affected by the reflection being selected as the colorimetric region, an appropriate image forming processing condition can be set with deterioration of the colorimetric accuracy suppressed.

Miscellaneous

Note that the functions of the host computer 101 for setting the colorimetric region described above can be incorporated into the image forming apparatus 100. Specifically, the CPU 114 of the image forming apparatus 100 displays the image, formed based on the image data stored in the HDD 115, on the operation panel 120. Then, a configuration may be employed in which the colorimetric region can be set with the user performing an operation on the operation panel 120 to switch between the automatic mode and the manual mode, designation of the colorimetric region under the manual mode, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-067245, filed Apr. 12, 2021 which is hereby incorporated by reference herein in its entirety.

What is claimed is:

1. An information processing apparatus that determines a colorimetric region to be measured by a colorimetric device, the colorimetric region being included in an image to be formed on a sheet by a printer, the information processing apparatus comprising:

a display configured to display an image to be printed by the printer; and a controller configured to:

acquire user designation information for designating a first candidate region as a candidate for the colorimetric region included in the image displayed on the display;

determine a second candidate region as a candidate for the colorimetric region included in the image displayed on the display based on a determination condition, the determination condition including a first condition regarding a number of pixels in a first direction within a region that satisfies a condition regarding color difference and a second condition regarding a number of pixels in a second direction perpendicular to the first direction within the region that satisfies the condition regarding the color difference;

receive user selection information regarding a selection result of a candidate colorimetric region selected from a plurality of candidate regions, the plurality of candidate regions including the first candidate region and the second candidate region; and determine the colorimetric region based on the user selection information.

2. The information processing apparatus according to claim 1, wherein the display is further configured to display color information regarding a color of the plurality of candidate regions.

3. The information processing apparatus according to claim 1, wherein the display displays images indicting ranges of the plurality of candidate regions to overlap the image displayed on the display.

4. The information processing apparatus according to claim 1, wherein upper limit of a number of the second colorimetric region is predetermined.

5. The information processing apparatus according to claim 1, wherein the controller is configured to determine the second candidate region based on the determination condition without a color designation.

6. The information processing apparatus according to claim 1, wherein the user designation information designates a plurality of first candidate regions, and the user selection information is information regarding a selection result of a plurality of colorimetric regions selected from the plurality of candidate regions.

7. The information processing apparatus according to claim 1, wherein the controller is configured to determine a plurality of second candidate regions as a candidate for the colorimetric region included in the image displayed on the display based on the determination condition, and the user selection information is information regarding a selection result of a plurality of colorimetric regions selected from the plurality of candidate regions.

8. The information processing apparatus according to claim 1, wherein the controller is configured to selectably display candidates of a plurality of colorimetric regions.

9. The information processing apparatus according to claim 1, wherein the controller is configured to control an image forming condition of the printer based on a measurement result of the colorimetric region output from the colorimetric device.

10. A non-transitory computer readable storage medium storing a program that determines a colorimetric region to be measured by a colorimetric device, the colorimetric region being included in an image to be formed on a sheet by a printer, wherein when executed by one or more processors of a computer including the one or more processors the program includes an instruction causing the computer to:

display an image to be printed by the printer on a display;

acquire user designation information for designating a first candidate region as a candidate for a colorimetric region included in the image displayed on the display;

determine a second candidate region as a candidate for the colorimetric region included in the image displayed on the display based on a determination condition, the determination condition including a first condition regarding a number of pixels in a first direction within a region that satisfies a condition regarding color difference and a second condition regarding a number of pixels in a second direction perpendicular to the first direction within the region that satisfies the condition regarding the color difference;

receive user selection information regarding a selection result of a candidate colorimetric region selected from a plurality of candidate regions, the plurality of candidate regions including the first candidate region and the second candidate region; and determine the colorimetric region based on the user selection information.

11. An image forming system that determines a colorimetric region to be measured by a colorimetric device, the colorimetric region being included in an image to be formed on a sheet by a printer, the image forming system comprising:

a printer configured to print an image on a sheet;

a display configured to display an image to be printed by the printer; and a controller configured to:

acquire user designation information for designating a first candidate region as a candidate for a colorimetric region included in the image displayed on the display;

determine a second candidate region as a candidate for the colorimetric region included in the image displayed on the display based on a determination condition, the determination condition including a first condition regarding a number of pixels in a first direction within a region that satisfies a condition regarding color difference and a second condition regarding a number of pixels in a second direction perpendicular to the first direction within the region that satisfies the condition regarding the color difference;

receive user selection information regarding a selection result of a candidate colorimetric region selected from a plurality of candidate regions, the plurality of candidate regions including the first candidate region and the second candidate region; and determine the colorimetric region based on the user selection information.

* * * * *